(12) United States Patent
Bellisard

(10) Patent No.: US 11,398,898 B2
(45) Date of Patent: Jul. 26, 2022

(54) SECURE RFID COMMUNICATION METHOD

(71) Applicant: TAGSYS, La Ciotat (FR)

(72) Inventor: Luc Bellisard, Seyssins (FR)

(73) Assignee: TAGSYS, La Ciotat (FR)

( * ) Notice: Subject to any disclaimer, the term of this patent is extended or adjusted under 35 U.S.C. 154(b) by 0 days.

(21) Appl. No.: 16/319,634

(22) PCT Filed: Jul. 21, 2017

(86) PCT No.: PCT/EP2017/068441
§ 371 (c)(1),
(2) Date: Mar. 8, 2021

(87) PCT Pub. No.: WO2018/015523
PCT Pub. Date: Jan. 25, 2018

(65) Prior Publication Data
US 2021/0203483 A1    Jul. 1, 2021

(30) Foreign Application Priority Data

Jul. 22, 2016 (FR) ..................... 1657042

(51) Int. Cl.
*H04L 9/06* (2006.01)
*G06K 7/10* (2006.01)
*G06K 19/07* (2006.01)

(52) U.S. Cl.
CPC ........ *H04L 9/0656* (2013.01); *G06K 7/10366* (2013.01); *G06K 19/0723* (2013.01)

(58) Field of Classification Search
CPC .............. H04L 9/0656; G06K 7/10366; G06K 19/0723
See application file for complete search history.

(56) References Cited

U.S. PATENT DOCUMENTS

| | | | |
|---|---|---|---|
| 5,699,981 | A | 12/1997 | McGrath et al. |
| 6,226,619 | B1 | 5/2001 | Halperin et al. |
| 6,378,903 | B1 | 4/2002 | Yabutsuka et al. |

(Continued)

FOREIGN PATENT DOCUMENTS

| DE | 102005025447 A1 | 12/2006 |
|---|---|---|
| EP | 1454291 B1 | 9/2004 |

(Continued)

OTHER PUBLICATIONS

International Search Report from corresponding International Application No. PCT/EP2017/068441, dated Oct. 12, 2017, pp. 1-2, European Patent Office, Rijswijk, The Netherlands.

*Primary Examiner* — Oleg Korsak
(74) *Attorney, Agent, or Firm* — Hauptman Ham, LLP

(57) ABSTRACT

A secure communication method between an RFID transponder and an RFID reader. The method includes at least the following steps: the RFID reader sends a series of random numbers A1 to the RFID transponder; the RFID transponder sends a series of random numbers A2 to the RFID reader; the RFID reader sends a result R1 to the at least one RFID transponder; the RFID transponder compares the result R1 with a result R1'. If R1' is equal to R1, then the RFID transponder switches from a locked communication mode to an unlocked communication mode, and sends a result R2' to the at least one RFID reader.

24 Claims, 3 Drawing Sheets

(56) References Cited

U.S. PATENT DOCUMENTS

| | | | |
|---|---|---|---|
| 6,946,951 B2 * | 9/2005 | Cole | G06K 7/0008 340/10.1 |
| 7,187,267 B2 * | 3/2007 | Cole | G06K 7/0008 340/10.1 |
| 8,566,588 B2 | 10/2013 | Lugt et al. | |
| 9,171,191 B2 * | 10/2015 | Xue | G06F 21/31 |
| 9,396,450 B2 * | 7/2016 | Gazdzinski | G06Q 20/363 |
| 2003/0006901 A1 * | 1/2003 | Kim | G06K 19/0723 340/572.1 |
| 2003/0191726 A1 | 10/2003 | Kirshenbaum | |
| 2004/0236701 A1 * | 11/2004 | Beenau | G06Q 20/32 705/64 |
| 2005/0058292 A1 * | 3/2005 | Diorio | H04K 1/02 380/270 |
| 2007/0069851 A1 | 3/2007 | Sung et al. | |
| 2007/0194889 A1 | 8/2007 | Bailey et al. | |
| 2007/0257776 A1 * | 11/2007 | Kim | G06K 7/10356 340/10.2 |
| 2008/0024280 A1 * | 1/2008 | Kato | G06K 7/0008 340/10.3 |
| 2008/0110977 A1 * | 5/2008 | Bonalle | G06K 19/07703 235/380 |
| 2008/0116274 A1 * | 5/2008 | Aldridge | D06F 93/00 235/440 |
| 2009/0015385 A1 * | 1/2009 | Teuwen | G06K 7/0008 340/10.51 |
| 2009/0027166 A1 | 1/2009 | Stevens et al. | |
| 2009/0051491 A1 | 2/2009 | Lu et al. | |
| 2009/0214038 A1 * | 8/2009 | Wong | G06K 7/0008 380/270 |
| 2009/0267747 A1 | 10/2009 | Rivest et al. | |
| 2009/0295545 A1 | 12/2009 | O'Haire et al. | |
| 2010/0146273 A1 * | 6/2010 | Kang | H04L 9/3271 713/168 |
| 2011/0187508 A1 | 8/2011 | Kim et al. | |
| 2013/0335198 A1 * | 12/2013 | Xue | G06K 7/10366 340/10.1 |
| 2015/0234985 A1 * | 8/2015 | Saunders | G16H 10/65 705/3 |
| 2016/0034728 A1 | 2/2016 | Oliver et al. | |

FOREIGN PATENT DOCUMENTS

| | | |
|---|---|---|
| EP | 1536306 A1 | 6/2005 |
| EP | 1653414 A2 | 5/2006 |
| EP | 1669946 A2 | 6/2006 |
| EP | 1837813 A1 | 9/2007 |
| EP | 1857953 B1 | 12/2008 |
| EP | 2309672 A1 | 4/2011 |
| FR | 3003979 A1 | 3/2013 |
| KR | 100722363 B1 | 5/2007 |
| WO | 9825212 A1 | 6/1998 |
| WO | 9904364 A1 | 1/1999 |
| WO | 0157808 A1 | 8/2001 |
| WO | 2004038644 A2 | 5/2004 |
| WO | 2004102312 A2 | 11/2004 |
| WO | 2005029764 A1 | 3/2005 |
| WO | 2005033872 A2 | 4/2005 |
| WO | 2005088523 A1 | 9/2005 |
| WO | 2005106807 A1 | 11/2005 |
| WO | 2006015145 A2 | 2/2006 |
| WO | 2006037202 A1 | 4/2006 |
| WO | 2006061005 A1 | 6/2006 |
| WO | 2006075146 A1 | 7/2006 |
| WO | 2006075150 A1 | 7/2006 |
| WO | 2006092626 A1 | 9/2006 |
| WO | 2007007229 A1 | 1/2007 |
| WO | 2007031908 A2 | 3/2007 |
| WO | 2007039835 A2 | 4/2007 |
| WO | 2007122425 A1 | 11/2007 |
| WO | 2007132420 A2 | 11/2007 |
| WO | 2008153550 A2 | 12/2008 |
| WO | 2009065211 A1 | 5/2009 |
| WO | 2012037350 A1 | 3/2012 |
| WO | 2012119242 A1 | 9/2012 |

* cited by examiner

SECURE RFID COMMUNICATION METHOD

CROSS-REFERENCE TO RELATED APPLICATIONS

The present application is a National Phase of International Application Number PCT/EP2017/068441, filed Jul. 21, 2017, which claims priority to French Application No. 1657042, filed Jul. 22, 2016.

DOMAIN OF THE INVENTION

The present invention relates to the field of radio frequency identification (RFID) in general, and more particularly a secure communication method between an RFID reader/interrogator and RFID transponders. The present invention will find applications in many fields such as the inventory of products in a warehouse or a store and more particularly in the field of distribution, traceability and authentication of products, preferably luxury products.

TECHNOLOGICAL BACKGROUND

RFID technology has seen an increase in its field of application in recent years. Formerly known only to the general public for its use in anti-theft systems, it is now present in many industrial sectors for traceability and stock management issues, for example.

Technological advances have made it possible to reduce the size of RFID transponders so that they can be incorporated into small elements, for example in textile elements or leather goods at a simple seam, but also affixed to documents. Initially used for its benefits in terms of security and traceability, this technology was confronted with hacking for product counterfeiting purposes, the objective of criminals being to provide a counterfeit product including an RFID transponder with information that misleadingly ensures the authenticity of the counterfeit product.

Thus, in an ever-increasing concern for security, many solutions aim at securing the access to data relating to RFID transponders. Some solutions provide for encrypted data exchanges, others secure access to access the data in the RFID transponder.

These solutions have somewhat improved the security level of access to the information included in the RFID transponders. Nevertheless, there is still a need to further improve this level of security without significantly increasing the cost of RFID transponders, which should remain low.

This invention aims at solving at least part of the problems described above.

SUMMARY

This invention relates to a secure communication method between at least one RFID transponder comprising at least one preferably unique identification number and at least one RFID reader, the method comprising at least the following steps:
- Said at least one RFID reader sends to said at least one RFID transponder at least a first series of random numbers A1;
- Said at least one RFID transponder sends to said at least one RFID reader at least one second set of random numbers A2;
- Said at least one RFID reader sends to said at least one RFID transponder at least one first result R1, generated from at least said first series of random numbers A1 and at least one first encryption function F1 stored in at least one memory outside the at least one RFID transponder;
- After said at least one RFID transponder receives the at least one first set of random numbers A1 and the at least one first result R1, said at least one RFID transponder compares said at least one first result R1 received with at least one second result R1' generated from at least said first set of random numbers A1 received and at least one first encryption function F1' stored in at least one memory of said RFID transponder;
- After the step of comparing said at least one first result R1 received with the at least one second result R1' and if said at least one second result R1' is equal to said at least one first result R1 received, then said at least one RFID transponder switches from a previously locked communication mode to an unlocked communication mode allowing said at least one RFID transponder to transmit on request said at least one unique identification number to the at least one RFID reader;
- After the step of comparing said at least one first result R1 received with the at least one second result R1' and if said at least one second result R1' is equal to said at least one first result R1 received, then said at least one RFID transponder sends to said at least one RFID reader at least one third result R2', generated from at least said second set of random numbers A2 and at least one second encryption function F2' stored in at least one memory of said RFID transponder;
- After the step of comparing said at least one first result R1 received with the at least one second result R1' and if said at least one second result R1' is different from said at least one first result R1 received, then said at least one RFID transponder remains in said locked communication mode preventing said at least one RFID transponder from transmitting upon request said at least one unique identification number to the at least one RFID reader;
- After said at least one RFID reader receives the at least one second set of random numbers A2 and the at least one third result R2', said at least one RFID reader compares said at least one third result R2' received with at least one fourth result R2 generated from at least said second set of random numbers A2 received and at least one second encryption function F2 stored in at least one memory outside the at least one RFID transponder;
- After the step of comparing said at least one third result R2' received with the at least one fourth result R2 and if said at least one third result R2' received is equal to the at least one fourth result R2, then said at least one RFID reader sends to said at least one RFID transponder at least one request for said at least one unique identification number;
- After receiving said request from said at least one unique identification number sent by said at least one RFID reader, and if said at least one RFID transponder is in said unlocked communication mode, then said at least one RFID transponder sends said at least one unique identification number to said at least one RFID reader.

The present invention allows a secure communication between an RFID reader and an RFID transponder based on the exchange of random numbers and the presence of cryptographic calculation functions on both the RFID reader and the RFID transponder. These cryptographic functions, preferably at least two, ensure the calculation of numerical results on the basis of series of random numbers, thus allowing the RFID reader to be authenticated by the RFID transponder and the RFID transponder to be authenticated by the RFID reader. Indeed, each of the two interlocutors can verify the authenticity of the other through this exchange of numbers and results. The authentication of one interlocutor with respect to the other is carried out when each interlocutor has the same encryption functions.

This double verification ensures in a simple and inexpensive way the authenticity of the actors involved in this secure communication in terms of system resources. Once this authentication is carried out, only the preferably unique identification number, called UID, is sent from the RFID transponder to the RFID reader, for example the information about the RFID transponder is accessible from a database from which the RFID reader can also be authenticated.

Thus, by simply sending data without any link other than the RFID transponder UID, with the actors of this secure communication, the present invention allows an RFID reader and an RFID transponder to identify each other.

In the case where an RFID transponder is associated with a product, such as a luxury product, it can be used to track the product through its distribution chain to certify its authenticity or even to update a history of the product to associate it with a given distribution network, for example. It is therefore important for any communication with the RFID transponder to be secured so that third parties cannot intercept the information relating to the product in order to copy it, for example, into an RFID transponder associated with a counterfeit product.

The present invention prevents this type of copying of information because if a third party intercepts the exchanges between the RFID reader and the RFID transponder, the latter will only collect random numbers, calculation results without knowing the encryption functions, since no encryption key is exchanged between the RFID reader and the RFID transponder.

This absence of encryption key exchange is an advantage compared to the solutions proposed in the state of the art. Indeed, these known solutions are based either on the use of significant system resources or on the exchange of sensitive information by radio waves. There are indeed many solutions based on the sending of encryption keys by radio waves or through a communication network. These exchanges can then be intercepted and the encryption keys retrieved by a third party for example. The present invention therefore secures communication between an RFID transponder and an RFID reader by not transmitting any encryption key.

In this sense, the present invention provides a much higher level of security than the solutions which provide for the exchange of encryption keys, without increasing the necessary system resources, even by reducing same. Indeed, the present invention relates to RFID transponders that are generally very far from the RFID reader, and for cost reasons these RFID transponders are, in a non-exhaustive way, preferably passive, i.e. the energy supplied to them to carry out the operations for which they are designed is limited to that which they generally receive from the RFID reader or from so-called "repeater" devices.

The present invention thus allows secure communication between an RFID reader and remote RFID transponders, the system resources of which are limited and much lower than in many other application fields. It should be noted in this respect that secure communication between close interlocutors, using NFC technology for instance, has much less energy constraints than RFID communication between an RFID reader and multiple RFID transponders remote from said RFID reader. Thus, the present invention on the one hand enhances the security of communications between an RFID reader and RFID transponders, which are generally remote, without increasing the system resources, which are generally very low due to the very architecture of RFID inventory systems, for example.

In addition, the dissociation of the identification number (UID) and information on the product associated with the RFID transponder also ensures the protection of such data. At no time are data relating to the product itself exchanged between the RFID reader and the RFID transponder before the end of the authentication process or even after authentication. Indeed, according to one embodiment, the authentication of each of these actors is done on both sides, and it is through a third actor, a database for example, that the reader accesses the data relating to the product associated with the RFID transponder.

The present invention relates to, among other things, a secure RFID inventory system configured to implement a secure communication method, comprising at least one RFID transponder comprising at least one preferably unique identification number, and being associated, preferably integral, with at least one manufactured product positioned in a commercial space, and at least one RFID reader, said system being characterized in that it is configured so that:

Said at least one RFID reader sends to said at least one RFID transponder at least a first series of random numbers A1;

Said at least one RFID transponder sends to said at least one RFID reader at least one second set of random numbers A2;

Said at least one RFID reader sends to said at least one RFID transponder at least one first result R1, generated from at least said first series of random numbers A1 and at least one first encryption function F1 stored in at least one memory outside the at least one RFID transponder;

After said at least one RFID transponder receives the at least one first set of random numbers A1 and the at least one first result R1, said at least one RFID transponder compares said at least one first result R1 received with at least one second result R1' generated from at least said first set of random numbers A1 received and at least one first encryption function F1' stored in at least one memory of said RFID transponder;

After the step of comparing said at least one first result R1 received with the at least one second result R1' and if said at least one second result R1' is equal to said at least one first result R1 received, then said at least one RFID transponder switches from a previously locked communication mode to an unlocked communication mode allowing said at least one RFID transponder to transmit on request said at least one unique identification number to the at least one RFID reader;

After the step of comparing said at least one first result R1 received with the at least one second result R1' and if said at least one second result R1' is equal to said at least one first result R1 received, then said at least one RFID transponder sends to said at least one RFID reader at least one third result R2', generated from at least said second set of random numbers A2 and at least one second encryption function F2' stored in at least one memory of said RFID transponder;

After the step of comparing said at least one first result R1 received with the at least one second result R1' and if said at least one second result R1' is different from said at least one first result R1 received, then said at least one RFID transponder remains in said locked communication mode preventing said at least one RFID transponder from transmitting upon request said at least one unique identification number to the at least one RFID reader;

After said at least one RFID reader receives the at least one second set of random numbers A2 and the at least one third result R2', said at least one RFID reader compares said at least one third result R2' received with at least one fourth result R2 generated from at least said second set of random numbers A2 received and at least one second encryption function F2 stored in at least one memory outside the at least one RFID transponder;

After the step of comparing said at least one third result R2' received with the at least one fourth result R2 and if said at least one third result R2' received is equal to the at least one fourth result R2, then said at least one RFID reader sends to said at least one RFID transponder at least one request for said at least one unique identification number;

After receiving said request from said at least one unique identification number sent by said at least one RFID reader, and if said at least one RFID transponder is in said unlocked communication mode, then said at least one RFID transponder sends said at least one unique identification number to said at least one RFID reader.

When an RFID system is used to take stock, this invention ensures that only authorized RFID readers and only authorized RFID transponders can communicate with each other on the basis of secure communication by random data exchange without exchanging encryption keys.

The present invention thus makes it possible to reduce the proliferation of counterfeit products, for example in the luxury sector, by making exchanges between RFID transponders and RFID readers opaque.

In addition, the present invention makes it possible to increase the protection of data contained in transponders, for example private data related to the client (client number, product guarantee number, etc.). The confidentiality of the client's private data is therefore improved.

The present invention also relates to a computer program product saved in at least one non-transient memory of at least one RFID transponder comprising at least one preferably unique identification number, and configured to perform at least the following steps carried out by said at least one RFID transponder:

Said at least one RFID transponder sends at least one series of random numbers A2 to at least one RFID reader;

After said at least one RFID transponder receives at least one series of random numbers A1 and at least one result R1, said at least one RFID transponder compares said at least one result R1 received with at least one result R1' generated from at least said series of random numbers A1 received and at least one encryption function F1' stored in at least one memory of said RFID transponder;

After the step of comparing said at least one received result R1 with the at least one result R1' and if said at least one result R1' is equal to said at least one received result R1, then said at least one RFID transponder switches from a previously locked communication mode to an unlocked communication mode allowing said at least one RFID transponder to transmit on request said at least one unique identification number to the at least one RFID reader;

After the step of comparing said at least one result R1 received with the at least one result R1' and if said at least one result R1' is equal to said at least one result R1 received, then said at least one RFID transponder sends to said at least one RFID reader at least one result R2', generated from at least said series of random numbers A2 and at least one encryption function F2' stored in at least one memory of said RFID transponder;

After the step of comparing said at least one received result R1 with the at least one result R1' and if said at least one result R1' is different from said at least one received result R1, then said at least one RFID transponder remains in said locked communication mode preventing said at least one RFID transponder from transmitting upon request said at least one unique identification number to the at least one RFID reader;

After receiving a request for said at least one unique identification number, and if said at least one RFID transponder is in said unlocked communication mode, then said at least one RFID transponder sends at least said at least one unique identification number to said at least one RFID reader.

The system resources available to an RFID transponder are generally small in order to limit the cost of mass production of such RFID transponders. In this context, the present invention advantageously enhances the security level of communications between an RFID transponder and an RFID reader without increasing its system resources and thus its energy needs.

The present invention also relates to an RFID transponder comprising at least one antenna, at least one microprocessor and at least one non-transient memory wherein the computer program product according to the present invention is saved.

This invention also relates to a computer program product saved in at least one non-transient memory outside at least one RFID transponder, and configured to perform at least the following steps carried out by at least one RFID reader:

Said at least one RFID reader sends to said at least one RFID transponder at least one series of random numbers A1;

Said at least one RFID reader sends to said at least one RFID transponder at least one result R1, generated from at least said series of random numbers A1 and at least one encryption function F1 stored in at least one memory outside the at least one RFID transponder;

After said at least one RFID reader receives at least one series of random numbers A2 and at least one result R2', said at least one RFID reader compares said at least one result R2' received with at least one result R2 generated from at least said series of random numbers A2 received and at least one encryption function F2 stored in at least one memory outside the at least one RFID transponder;

After the step of comparing said at least one received result R2' with the at least one result R2' and if said at least one received result R2' is equal to the at least one result R2, then said at least one RFID reader sends to said at least one RFID transponder at least one request for at least one preferably unique identification number.

The system resources available to an RFID reader are potentially very important, however, for reasons of production cost and efficiency, this invention is designed not to increase the system resources available to an RFID reader in general while increasing the security level of communications between the RFID reader and the RFID transponders.

The present invention also relates to an RFID reader comprising at least one antenna, at least one microprocessor and at least one non-transient memory inside which the computer program product according to the present invention is saved.

BRIEF INTRODUCTION OF THE DRAWINGS

The purposes, objects, characteristics and advantages of the invention will be best illustrated by the detailed description of one embodiment thereof, which is illustrated by the following appended drawings wherein.

Figure 3:
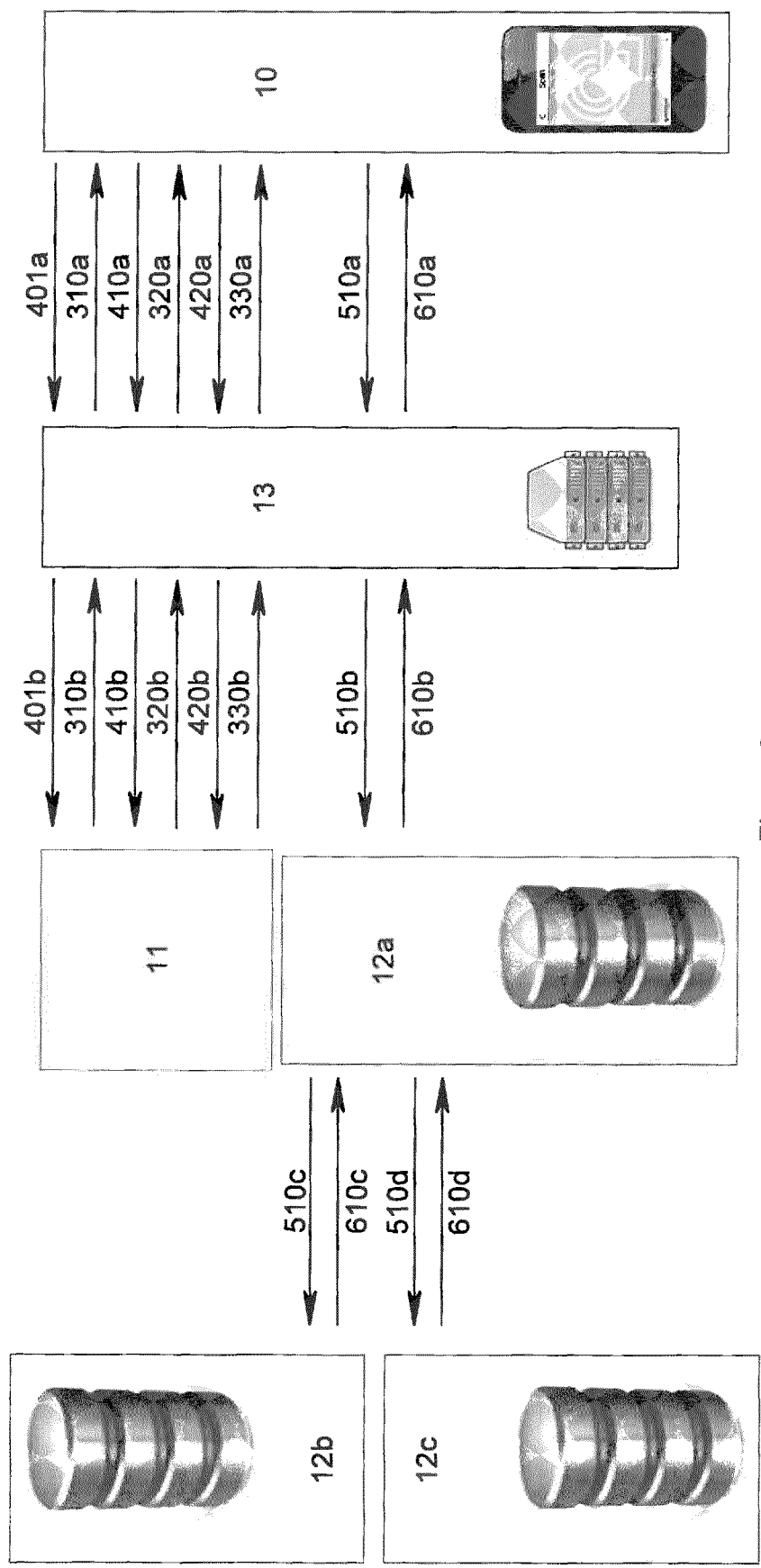

FIG. 3 illustrates in detail, according to one embodiment of the present invention, the communication flows between an RFID reader 10 and at least one database gateway 12a comprising at least two databases 12b and 12c through an authentication platform 13.

The attached drawings are given as examples and are not restrictive to the invention. These drawings are schematic representations and are not necessarily on the scale of practical application.

DETAILED DESCRIPTION

Before starting a detailed review of the embodiments of the invention, the following are optional characteristics that may be used in combination or alternatively:

Advantageously, the calculation of the at least one result R2 is carried out before the at least one result R2' is sent by the at least one RFID transponder to the at least one RFID reader.

Advantageously, the calculation of the at least one R2 result is carried out after the at least one result R2' is sent by said at least one RFID transponder to said at least one RFID reader.

Advantageously, the sending by said at least one RFID transponder to said at least one RFID reader of the at least one series of random numbers A2 is carried out after the sending by said at least one RFID reader to said at least one RFID transponder of the at least one result R1

Advantageously, said at least one result R1 is generated from at least said at least one series of random numbers A1, said at least one series of random numbers A2 and said at least one encryption function F1, and wherein said at least one result R1' is generated from at least said at least one series of random numbers A1, said at least one series of random numbers A2 and said at least one encryption function F1'.

This increases security and encryption level since the results transmitted depend on both series of random numbers.

Advantageously, said at least one result R2' is generated from at least said at least one series of random numbers A1, said at least one second series of random numbers A2 and said at least one encryption function F2, and wherein said at least one result R2 is generated from at least said at least one series of random numbers A1, said at least one series of random numbers A2 and said at least one encryption function F2'.

This increases security and encryption level since the results transmitted depend on both series of random numbers.

Advantageously, if said at least one result R1 is equal to said at least one result R1', then the one among the RFID transponder or the RFID reader or the encryption server that performs the comparison infers that said at least one encryption function F1 is equal to said at least one encryption function F1'.

Advantageously, if said at least one result R2 is equal to said at least one result R2', then the one among the RFID transponder or the RFID reader or the encryption server that performs the comparison infers that said at least one encryption function F2 is equal to said at least one encryption function F2'.

Advantageously, the at least one RFID reader is in wired and/or wireless communication with at least one database.

This allows either to have a database located in the RFID reader itself for logistical reasons, or to have a remote database in wireless communication with the RFID reader through all types of preferably secured networks.

Advantageously, said at least one RFID reader sends to said at least one database at least said identification number of said at least one RFID transponder, preferably after receipt by said at least one RFID reader of said at least one identification number sent by said at least one RFID transponder.

This makes it possible to check the existence of the RFID transponder in the database and to obtain information about the RFID transponder and therefore the product with which it is associated.

Advantageously, said at least one RFID reader receives from said at least one database data associated with said at least one identification number of the at least one RFID transponder after identification of said at least one RFID transponder by said at least one database from said at least one identification number, preferably in response to said sending to said at least one database of said at least one identification number of said at least one RFID transponder.

This makes it easy to find information related to the product considered as the carrier of the RFID transponder for questions of authenticity and/or traceability, for example.

Advantageously, said at least one database includes at least one authentication platform configured to allow or not said at least one RFID reader to communicate with said at least one database.

This certifies the authenticity of the RFID reader to the database.

Advantageously, an authentication platform ensures the authenticity of the RFID reader in its exchanges with the encryption module and/or the database.

This certifies the authenticity of the RFID reader to the encryption module and/or database.

Advantageously, said at least one RFID reader is in wired and/or wireless communication with at least one encryption module, and said at least one RFID reader receives from said at least one encryption module at least said series of random numbers A1.

Advantageously, said at least one RFID reader includes said at least one encryption function F1 and said at least one encryption function F2, and is preferably configured to generate at least said at least one result R1 and said at least one result R2

Advantageously, said at least one encryption module comprises said at least one encryption function F1 and said at least one encryption function F2, and preferably is configured to generate at least said at least one result R1 and said at least one result R2.

This makes it possible to have an encryption module either placed in the RFID reader itself for logistical reasons, or to have a remote encryption module whose exchanges with the RFID reader remain exchanges of random numbers and encryption function results.

Advantageously, said at least one encryption module is included in said at least one database.

This makes it possible to centralize part of the infrastructure of the present invention.

Advantageously, said at least one RFID reader receives from said at least one encryption module said series of random numbers A1.

This allows you to have a series of random or pseudo-random numbers according to the characteristics of the encryption module.

Advantageously, said at least one RFID reader receives from said at least one encryption module said at least one result R1 generated by said at least one encryption module, preferably before sending by said at least one RFID reader said at least one result R1 to said at least one RFID transponder.

This provides system resources dedicated to cryptographic calculations.

Advantageously, said at least one RFID reader sends to the at least one encryption module at least said series of random numbers A2, preferably after receipt by said at least one RFID reader of at least said series of random numbers A2 sent by said at least one RFID transponder.

This makes it possible to calculate the at least one result R2 in order to compare it with the at least one result R2'.

Advantageously, said at least one RFID reader sends to the at least one encryption module at least said at least one result R2', preferably after receipt by said at least one RFID reader of at least said at least one result R2' sent by said at least one RFID transponder.

This makes it possible to compare the at least one result R2 with the at least one result R2' and to authenticate the RFID transponder.

Advantageously, said at least one RFID reader receives from said at least one encryption module at least one command to request the identification number of the at least one RFID transponder provided that said at least one result R2 is equal to said at least one result R2', preferably after said at least one RFID reader sends said at least one result R2' to said at least one encryption module.

This allows only RFID transponders authenticated by this invention to be interrogated to obtain their preferably unique identification numbers.

Advantageously, said at least one encryption module is configured to compare said at least one result R2 with said at least one result R2'.

Advantageously, said at least one encryption module is an application server.

This allows the encryption module to be virtualized and one or more random number sources to be used, for example.

Advantageously, the at least one RFID transponder is associated with a manufactured product placed in a commercial sales area or a storage warehouse.

Advantageously, said at least one RFID transponder is associated with a manufactured product positioned in a commercial sales area or a warehouse and preferably including a density of RFID transponders at least equal to 0.05 transponders per square meter, preferably at least one transponder per square meter and advantageously at least 4 transponders per square meter.

This makes it possible to authenticate and certify products, such as luxury goods, and also to identify counterfeit products.

Advantageously, the first set of random numbers A1 contains at least 8 bits, preferably at least 16 bits, and advantageously at least 32 bits.

Advantageously, the second set of random numbers A2 contains at least 8 bits, preferably at least 16 bits, and advantageously at least 32 bits.

Advantageously, an authentication platform is positioned at the level of exchanges between the at least one RFID reader and the at least one encryption module and/or the at least one database.

Advantageously, the authentication platform is configured to allow communication between the RFID reader and the encryption module and/or database, if and only if the RFID reader is authenticated by the authentication platform.

Advantageously, the database can include a database gateway between at least one RFID transponder database and a product database.

Advantageously, the at least one RFID transponder includes the at least one encryption function F1' and the at least one encryption function F2'.

Advantageously, the at least one RFID reader includes at least one encryption module including the at least one encryption function F1 and the at least one encryption function F2.

Advantageously, the at least one RFID transponder includes at least one memory module configured to store data in a non-transitory manner.

Advantageously, the at least one RFID transponder has at least one locked mode of operation and at least one unlocked mode of operation.

The preferential field of application of the present invention is the interrogation of RFID transponders in points of sale or storage, and in particular in the luxury sector. Indeed, the present invention is particularly advantageous in responding to the problems inherent in the world of luxury manufactured goods, which are heavily affected by counterfeiting.

Indeed, at a time when RFID systems are beginning to be set up for the traceability and authentication of luxury products, the world of counterfeiting is already taking measures to counterfeit data relating to the traceability and authenticity of counterfeit products.

In this description, "RFID TAG", "RFID Transponder" or their equivalents refer to any device generally comprising at least one antenna and an electronic microchip containing data, and configured to communicate with an electromagnetic wave reading device so that said reader can read said data contained in the electronic microchip.

There are many types of RFID transponders, generally grouped into two dominant categories: so-called passive RFID transponders and so-called active RFID transponders.

"Passive RFID TAG", "passive RFID transponder" or their equivalents are generally defined as any RFID transponder comprising at least one antenna and being powered by an electromagnetic wave received by the antenna, which can also be described as a remotely powered RFID transponder.

With regard to the other main category of RFID transponders, "TAG RFID active", "RFID active transponder" or their equivalents are generally defined as any RFID transponder powered by its own energy source and/or a local energy source, which can also be described as a self-powered RFID transponder.

One of the objectives of this invention is to provide a simple, inexpensive and resource-saving solution for secure radio communication between at least one RFID reader and at least one RFID transponder so that each can authenticate itself with the other.

This double authentication allows only authorized RFID readers to communicate with the RFID transponder and only authorized RFID transponders to communicate with the RFID reader.

It should be recalled that "RFID reader", "RFID interrogator" or their equivalents are generally defined as a device configured to communicate through electromagnetic waves with one or more RFID devices such as one or more RFID transponders.

We will generally speak of "standard RFID reader", "standard RFID interrogator" or equivalents which then are defined as an RFID reader communicating on the basis of regulated and standardized communication protocols (EPC UHF Gen2 standard and ISO 18000-6 standard), this type of standard RFID reader is easily available at most RFID reader distributors.

Thus, according to the EPC UHF Gen2 and ISO 18000-6 standards, a "standard RFID reader" transmits and reads signals with frequencies between 840 MHz and 960 MHz depending on the geographical areas where the UHF RFID system is used. Thus in the USA the UHF band allocated to UHF applications is between 902 and 928 MHz while in Europe it is between 866 and 868 MHz. China allows frequencies between 840 and 844 MHz and Japan allows frequencies between 952 MHz and 958 MHz.

According to one preferred embodiment, RFID transponders, for safety reasons, can have two operating modes: one locked and the other unlocked.

In the locked operating mode, the data contained in the RFID transponder is inaccessible to the RFID reader.

In the unlocked operating mode, the data contained in the RFID transponder is accessible to the, preferably authenticated, RFID reader.

Switching from locked to unlocked mode can, for example and preferably, be done after authentication of the RFID reader with the RFID transponder.

Thus, for example, with regard to luxury bags, including at least one RFID transponder that may or may not be permanently installed, the present invention allows only an authorized RFID reader to query said RFID transponder, and for the user to authenticate said bag on the basis of the preferably unique, identification number, also known as UID for "Unique Permanent Identification", of said RFID transponder through a preferably also secure database. Typically, the identification number, or UID, is stored in a memory of the RFID transponder.

The present invention can indeed be applied to follow a product, preferably a luxury product, through its distribution chain and in a secure manner.

This invention can also be applied to any existing RFID system, whether for traceability, inventory or product authentication.

Figure 1:
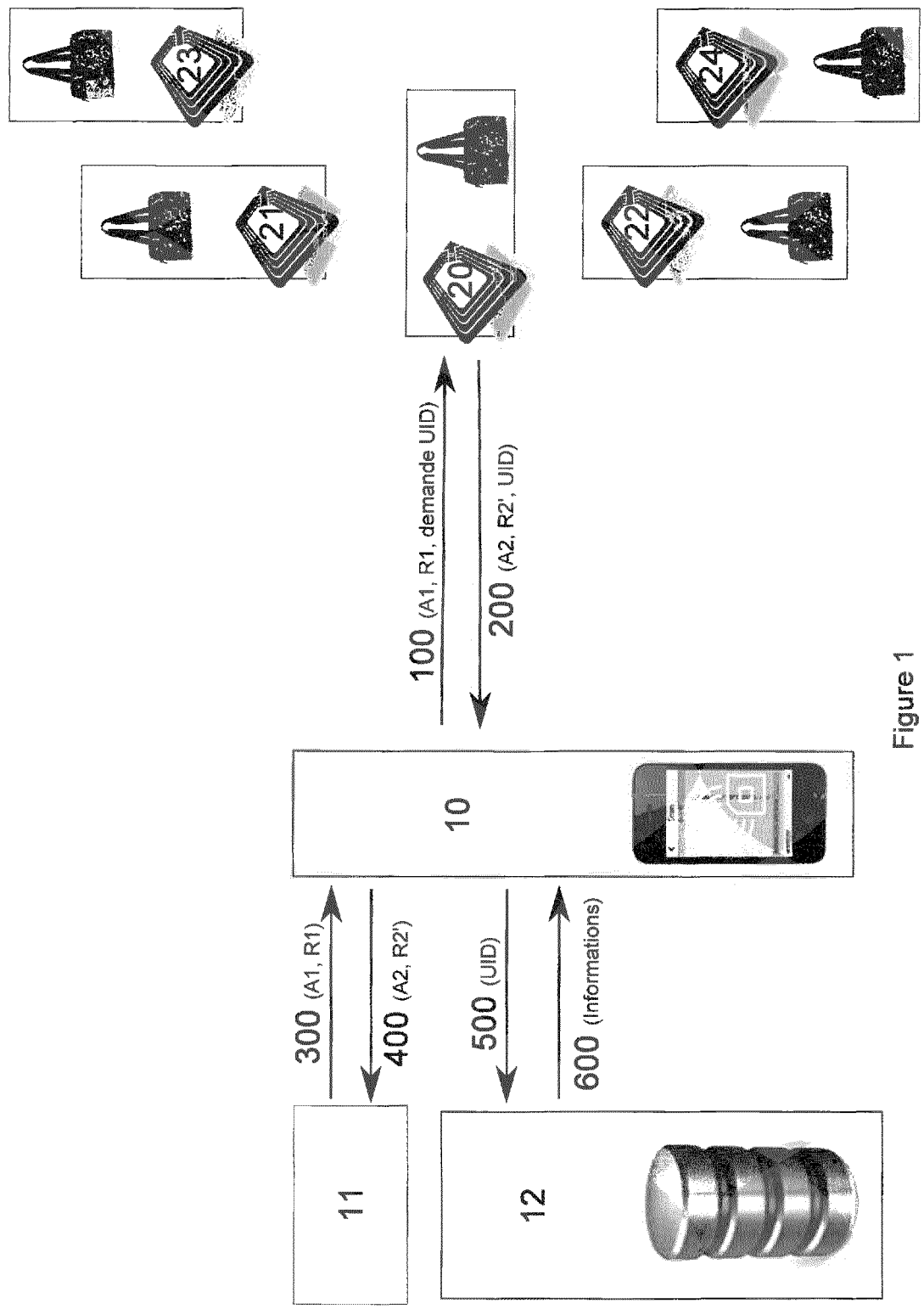
FIG. 1 illustrates, according to one embodiment of this invention, the communication flows between an RFID reader 10 and an RFID transponder 20 associated, for example, with a leather goods product.
Figure 2:
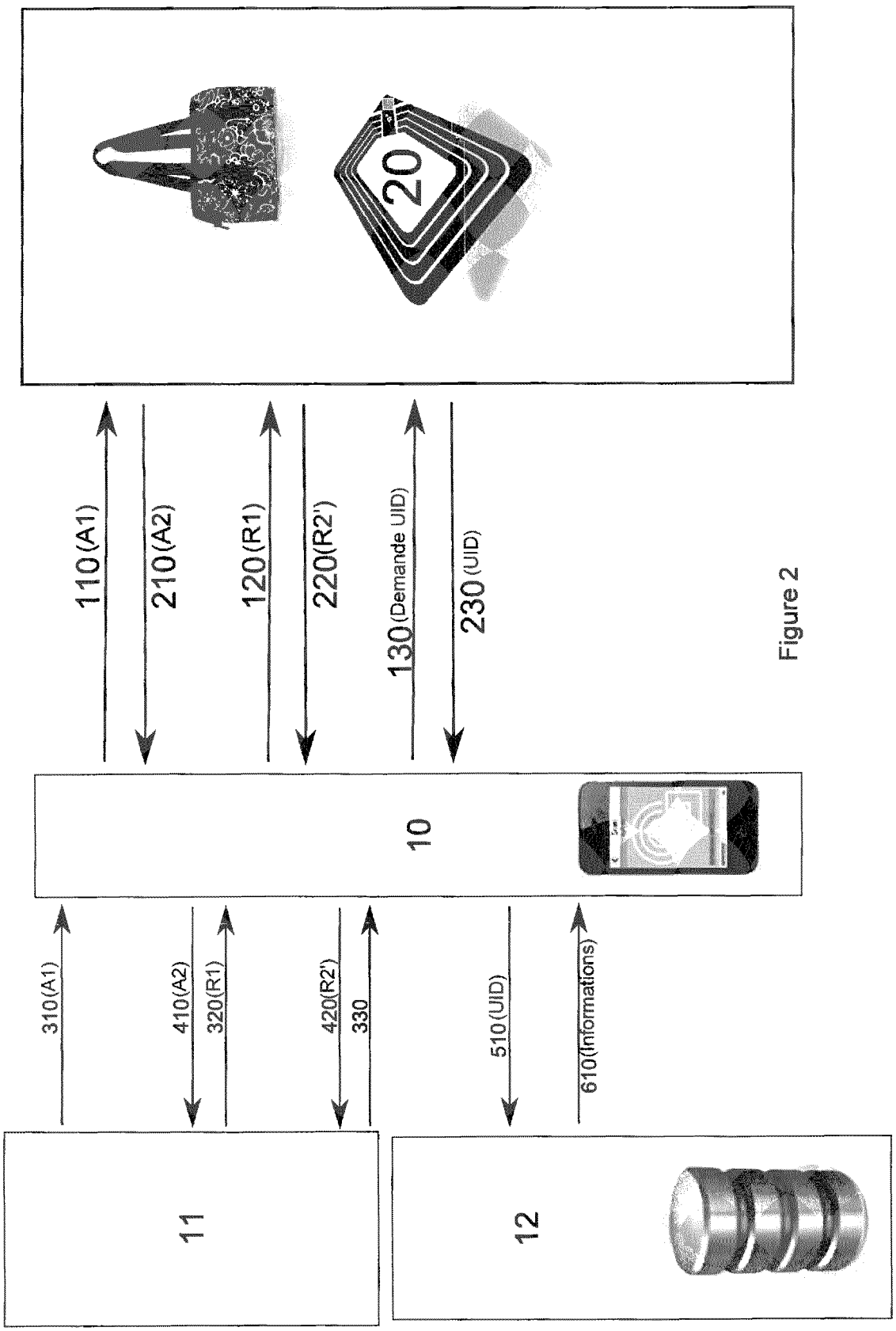
FIG. 2 illustrates in detail, according to one embodiment of this invention, the communication flows between an RFID reader 10 and an RFID transponder 20 associated, for example, with a leather goods product.

We will now describe, in a non-exhaustive way and by way of exemplary embodiments, the present invention on the basis of FIGS. 1 to 3.

FIG. 1 illustrates, according to one embodiment of the present invention, a system comprising at least one RFID reader 10, a plurality of RFID transponders, hereinafter referred to as TAG 20, 21, 22, 23, 24, at least one database 12 and at least one encryption module 11. FIG. 1 illustrates the application of this invention to the luxury sector, for example, in the case where leather goods, in this case bags, include TAG 20, 21, 22, 23, 24 or not.

Advantageously, the RFID reader 10 can be any type of, preferably but not necessarily, portable device able to function as a standard preference RFID reader. For example, they may be terminals located in a warehouse, in a commercial space such as a shop, or they may also be a portable communication device such as a tablet, a telephone, a smartphone or a standard RFID reader. The RFID reader 10 is represented as an example by a smartphone in FIG. 1.

This invention has no limitation in the use of a particular RFID standard but can be applied to any type of communication between a reader and a transponder.

Similarly, the present invention is not limited to a single type of TAG but can be applied to all types of TAGs capable of transmitting to an RFID reader at least one series of random numbers and at least one result based on encryption calculations based on encryption functions, preferably two encryption functions. These may be passive and/or active TAGs, for example.

It is specified that in this description, "series of random numbers", "series of pseudo-random numbers" or their equivalents are generally defined as a series of numbers without any deterministic relationship between them generated from a random phenomenon, or from an algorithm.

Similarly, "encryption function", "hash function", "encryption key" or their equivalents are usually defined as a particular mathematical function which, on the basis of data provided as input, calculates a fingerprint to quickly identify the initial data. Thus, for example, an encryption function calculates from a series of numbers a result from which it is possible, knowing the encryption function used, to find said series of numbers.

Preferably, the TAG 20, 21, 22, 23, 24 includes at least two operating modes, one called locked and the other called unlocked according to the definitions introduced previously.

According to the embodiment, the database 12 can be integrated into the RFID reader 10 itself in order to provide high mobility. This embodiment may be appropriate for representatives of product companies, such as luxury goods companies, who travel to resellers to authenticate certain products or carry out traceability studies. In this situation, having an encryption module 11 integrated in the RFID reader is also one embodiment of the present invention that may be appropriate for logistical and portability reasons. Indeed, the representative can have, in a single RFID reader 10, the encryption module 11 and the database 12.

According to another embodiment, only the database 12 and/or the encryption module 11 are integrated in the RFID reader 10.

Advantageously, the RFID reader 10 is in communication with the encryption module 11 and the database 12 whether wired or wirelessly through various types of preferably secure communication networks.

According to a preferred embodiment, the encryption module 11 includes encryption functions called F1 and F2 below, and TAG 20, 21, 22, 23, 24 all include the same encryption functions called F1' and F2' below.

In order for the RFID reader 10 and the TAG 20, 21, 22, 23, 24 to authenticate each other, F1 must then be equal to F1' and F2 must be equal to F2', i.e. the F1 and F1' functions must be identical and the functions F2 and F2' must also be identical.

Preferably, these encryption functions F1' and F2' are implemented in TAG 20, 21, 22, 23, 24 [??] their activation for example.

The encryption functions F1 and F2 are implemented in the encryption module 11 when it is activated, for example.

We will now describe, according to one embodiment of the present invention illustrated in FIG. 2, the retrieval, by the RFID reader 10, of the preferably unique identification number and hereinafter called UID, of the TAG 20 and the product information associated with the TAG 20.

According to one embodiment, the TAG 20 is in its locked operating mode and the RFID reader 10 receives 310 from the encryption module 11 at least a first set of random numbers A1 which it then transmits 110 to the TAG 20.

Preferably, the TAG 20 then stores, in a memory module for example, the first set of random numbers A1 and transmits 210 to the RFID reader 10 at least a second set of random numbers A2. The memory that saves the series(s) of random numbers can be the same as the one that saves the RFID transponder identification number.

This second series of random numbers A2 is generated by the TAG 20. This generation can be based on the system resources of the TAG 20 and/or be based on lists of series of random numbers, lists of random numbers, one or more pseudo-random number generation algorithms or random phenomena.

Then, the RFID reader 10 sends 410 the second set of random numbers A2 to the encryption module 11. The encryption module 11 then preferably performs two cryptographic preference calculations: a calculation of a result R1 from a first encryption function F1 and at least the first series of random numbers A1, and preferably from the first series of random numbers A1 and the second series of random numbers A2, and a calculation of a result R2 from a second encryption function F2 and at least the second series of random numbers A2, and preferably from the first series of random numbers A1 and the second series of random numbers A2. Alternatively, R2 can be calculated later, when the present invention requires this result, i.e. after the receipt of the result R2' by the RFID reader 10 sent by the TAG 20 as described below, in order to limit the system resources.

Preferably, the result R1 is a function F1 of the series of random numbers A1 and A2 noted: R1=F1(A1, A2), and the result R2 is a function F2 of the random number series A1 and A2 noted: R2=F2(A1, A2).

Advantageously, the encryption function F1 is stored in a non-transient memory outside the TAG 20, so that the TAG 20 does not have access to this memory. The same is preferably true for the encryption function F2.

The RFID reader 10 receives 320 from the encryption module 11 the first result R1 that it transmits 120 to the TAG 20.

The TAG 20 then performs an encryption calculation based on the first encryption function F1' and the first set of random numbers A1, and preferably the first set of random numbers A1 and the second set of random numbers A2, to generate a result R1'.

Preferably, the result R1' is a function F1 of the series of random numbers A1 and A2 noted: R1'=F1' (A1, A2).

Advantageously, the encryption function F1' is stored in a non-transient memory outside the RFID reader 10 and/or the encryption module 11. The same is preferably true for the encryption function F2'.

The TAG 20 then compares the result R1 received from the RFID reader 10 with the result R1'. If the RFID reader 10 and the TAG 20 are authentic, then the encryption function F1 is identical to the encryption function F1', and therefore the encryption module 11 and the TAG 20 include the same encryption functions, therefore, the results R1 and R1' are equal. This comparison step ensures the authentication of the RFID reader 10 to the TAG 20.

In case R1' is equal to R1, then the TAG 20 switches from its locked operating mode to its unlocked operating mode to allow the authenticated RFID reader 10 to access its data. Otherwise, the TAG 20 remains in its locked operating mode, prohibiting access to its data to the RFID reader 10, which has not been authenticated.

In addition, and according to a preferred embodiment, in case R1' is equal to R1, the TAG 20 performs an encryption calculation based on the second encryption function F2' and the second set of random numbers A2, and preferably the first set of random numbers A1 and the second set of random numbers A2, in order to generate a result R2'. This allows R2' to be calculated only if the RFID reader 10 has been previously authenticated by the TAG 20.

Advantageously, the result R2' is a function F2' of the series of random numbers A1 and A2 noted: R2'=F2' (A1, A2).

The TAG 20 sends 220 the result R2' to the RFID reader 10.

Preferably, switching from the locked function mode to the unlocked operating mode of the TAG 20 can be made before or after the TAG 20 sends the result R2' to the RFID reader 10.

After receiving the result R2', the RFID reader 10 transmits the result R2' 420 to the encryption module 11 so that the latter can perform a comparison between the result R2 and the result R2'. These two results must be equal if the TAG 20 is authentic. This step then allows the TAG 20 to be authenticated to the RFID reader 10. If the two results R2 and R2' are equal, then the encryption module 11 notifies 330 to the RFID reader 10 by sending it, preferably, a request command from the TAG 20 UID.

The RFID reader 10 sends 130 a request to the TAG 20 for its UID. With the TAG 20 in its unlocked operating mode, it transmits 230 its UID to the RFID reader 10.

Advantageously, the RFID reader 10 transmits 510 said UID received from the TAG 20 to the database 12 in order to check the existence of the TAG 20 in the database and to obtain the data related to the product associated with the TAG 20.

As a matter of fact, the database 12 saves the data assigned to the TAG 20 UID, which is used as a code for accessing the data, for example.

The database 12 transmits 610 the product data associated with the TAG 20 to the RFID reader 10.

According to one embodiment, the RFID reader 10 includes a display device to visualize said data related to said product.

Thus, for example, the employee of a luxury store can use his/her RFID reader, for example a smartphone, to establish a secure communication with the RFID transponders of a particular bag to determine its authenticity or simply to obtain information about the bag such as the composition, origin, distribution channel thereof, etc.

In order to summarize here the secure communication method between the TAG 20 and the RFID reader 10, we will present the different steps carried out according to the description in FIG. 2 illustrating a possible embodiment of the present invention.

The present invention may, for example, include but is not limited to the following steps:

310: Sending from the encryption module 11 to the RFID reader 10 of at least a first series of random numbers A1;

110: Sending from the RFID reader 10 to the TAG 20 of the first series of random numbers A1;

Preferably, the first set of random numbers A1 is stored in a memory module of the TAG 20;

210: Sending from the TAG 20 to the RFID reader 10 of at least a second set of random numbers A2;

410: Sending from the RFID reader 10 to the encryption module 11 of the second set of random numbers A2;

Calculation of at least a first result R1 based on the encryption function F1 and the first series of random numbers A1 and the second series of random numbers A2.

Calculation of at least a fourth result R2 based on the encryption function F2 and the first set of random numbers A1 and the second set of random numbers A2.

320: Sending from the encryption module 11 to the RFID reader 10 of the first result R1;

120: Sending from the RFID reader 10 to the TAG 20 of the first result R1;

Calculation of at least a second result R1' based on the encryption function F1' and the first series of random numbers A1 and the second series of random numbers A2.

If R1' is equal to R1, the TAG 20 then switches its operating mode from locked to unlocked mode, and the TAG 20 calculates at least a third result R2' based on the encryption function F2' and the first set of random numbers A1 and the second set of random numbers A2.

220: Sending from the TAG 20 to the RFID reader 10 of the third result R2';

420: Sending from the RFID reader 10 to the encryption module 11 of the third result R2';

If R2' is equal to R2: 330: Sending from the encryption module 11 to the RFID reader 10 of at least one command to request the TAG 20 preferably the unique identification number;

130: Sending from the RFID reader 10 to the TAG 20 of at least one request for an identification number;

230: Sending from the TAG 20 to the RFID reader 10 of its identification number;

510: Sending from the RFID reader 10 to the database 12 of the identification number;

610: Sending from the database 12 to the RFID reader 10 of at least one data related to the product associated with the TAG 20.

Thus the present invention ensures the establishment of a secure communication between the RFID reader 10 and the TAG 20 without exchanging encryption keys or sensitive data. As a result, a malicious person listening to the exchanges between the RFID reader 10 and the TAG 20 could not retrieve identification or authentication data to communicate with the TAG 20.

The present invention therefore makes it possible to limit or even prevent any counterfeiting of RFID transponders associated with products and thus the false pretense of authenticity of counterfeit products.

We will now describe, on the basis of FIG. 3, one embodiment wherein the database 12 includes at least one database gateway 12a, at least one first RFID transponders database 12b and at least one products database 12c associated with RFID transponders.

The database gateway 12a provides the link between the RFID reader 10, the RFID transponder database 12b and the product database 12c.

The RFID transponder 12b database includes, for example, all identification numbers, i.e. UIDs for example, of all authentic, i.e. not counterfeit RFID transponders.

The product 12c database includes, for example, product information associated with RFID transponders using the identification number as the link between the product information and the RFID transponder associated with the product. This information may relate to traceability, certification, composition, ownership, etc.

The database gateway 12a thus makes it possible to confirm the existence of a TAG in the RFID transponder database 12b before searching the product database 12c.

This saves system resources by separating the TAG existence search step in the RFID transponder 12b database from the information search step in the product 12c database.

It also makes it possible, in the case where a plurality of product databases are part of the system of the present invention, to direct an information request to the right database.

Advantageously, in order to increase security between the RFID reader 10 and the encryption module 11 and/or the database 12, it is possible to have an authentication platform 13 at the level of exchanges between the RFID reader 10 and the encryption module 11 and/or the database 12.

FIG. 3 illustrates, according to one embodiment of the present invention, a system comprising an authentication platform 13 positioned from a point of view of communication exchanges between the RFID reader 10 and the encryption module 11 and a database gateway 12a allowing access to a TAG database 12b and a product database 12c. FIG. 3 represents only the part of the present invention concerning the communication between the RFID reader 10 and the authentication platform 13, the exchanges with the TAG 20 being unchanged in this embodiment compared to the description in the previous FIG. 2.

In this embodiment, all communications to and from the RFID reader 10 and the encryption module 11 and the elements 12a, 12b and 12c of the database 12 pass through the authentication platform 13 so that the RFID reader 10 is authenticated at each exchange during communications between these various elements of the present invention.

Thus, a first step of the present invention, according to this embodiment, relates to the authentication of the RFID reader 10 to the authentication gateway 13 by sending 401a a request for authentication. This request, if accepted, i.e. if the RFID reader 10 is authenticated by the authentication gateway 13, leads, according to one embodiment, to the creation of a communication session between the RFID reader 10, now having an identifier with the authentication platform 13, and said authentication platform 13.

This request for authentication being accepted, it advantageously allows a request 401b for a first series of random numbers A1 from the encryption module 11.

It should also be noted that the steps concerning communications between the RFID reader 10 and the TAG 20 remain unchanged as compared to the previous description in FIG. 2. Similarly, the cryptographic calculations and result comparison steps remain unchanged as compared to the previous description in FIG. 2.

The embodiments of FIGS. 2 and 3 are perfectly compatible. FIG. 3 can be understood as a more detailed and precise description of the embodiment of FIG. 2.

Thus, in the same way as the description in FIG. 2, the description of this embodiment illustrated by FIG. 3 can be summarized through the following steps:

401a: Sending from the RFID reader 10 to the authentication platform 13 of at least one request for authentication;

If the request for authentication is accepted by the authentication platform 13: opening of a communication session with the RFID reader 10 and the authentication platform 13 including the assignment of a preferably unique identifier to the RFID reader 10;

401b: Sending from the authentication platform 13 to the encryption module 11 of at least one request for at least a first series of random numbers A1;

310b: Sending from the encryption module 11 to the authentication platform 13 of at least a first series of random numbers A1;

310a: Sending from the authentication platform 13 to the RFID reader 10 of at least a first series of random numbers A1;

410a: Sending from the RFID reader 10 to the authentication platform 13 of at least a second set of random numbers A2 received from the TAG 20;

410b: Sending from the authentication platform 13 to the encryption module 11 of at least a second set of random numbers A2;

320b: Sending from the encryption module 11 to the authentication platform 13 of at least one first result R1;

320a: Sending from the authentication platform 13 to the RFID reader 10 of at least one first result R1;

420a: Sending from the RFID reader 10 to the authentication platform 13 of at least a third result R2' received from the TAG 20;

420b: Sending from the authentication platform 13 to the encryption module 11 of at least a third result R2';

330b: Sending from the encryption module 11 to the authentication platform 13 of at least one command to request the TAG 20 identification number;

330a: Sending from the authentication platform 13 to the RFID reader 10 of at least one command to request the TAG 20 identification number;

510a: Sending from the RFID reader 10 to the authentication platform 13 of at least one identification number;

510b: Sending from the authentication platform 13 to the database gateway 12a of at least one identification number;

510c: Sending from the database gateway 12a to the RFID transponder database 12b of at least one identification number;

610c: Sending from the RFID transponder database 12b to the database gateway 12a of at least one TAG 20 existence information;

510d: Sending from the database gateway 12a to the product database 12c of at least one identification number;

610d: Sending from the product database 12c to the database gateway 12a of at least one piece of information about said product;

610b: Sending from the database to the authentication platform of at least one data related to a product;

610a: Sending from the authentication platform to the RFID reader of at least one data related to a product;

According to a preferred embodiment, this invention includes at least three different levels of identification to ensure the security of communication:

The first level relates to the authentication of the RFID reader 10 to the identification platform 13 allowing it to communicate with both the encryption module 11 and also the database 12, including here as an example without limitation a database gateway 12a, a RFID transponders database 12b and a products database 12c.

The second level of authentication relates to the authentication of the RFID reader 10 with the RFID transponder 20 allowing the RFID transponder 20 to switch from its locked operating mode to its unlocked operating mode.

The third level of authentication relates to the authentication of the RFID transponder 20 to the encryption module 11, thus allowing the RFID reader 10 to send a request for its identification number.

Optionally but advantageously, this invention introduces a fourth level of authentication by using the RFID transponder database 12b to confirm the existence of the authenticated RFID transponder 20 before accessing the product database 12c.

The use of these different security levels ensures that only authenticated RFID transponders belonging to the RFID transponder database can be used to access the content of the product database, and that only authenticated RFID readers can communicate with the encryption module, the product database and the authenticated RFID transponder.

The present invention therefore relates to a method for establishing secure communication between an RFID reader and an RFID transponder by simply exchanging random data without any link with real data specific to the RFID reader or transponder.

The present invention is particularly suitable for the luxury goods sector where it makes it difficult or even impossible to exploit counterfeit products. Indeed, the present invention makes it difficult or even impossible to access the data contained in authentic RFID transponders in order to collect or modify same in order to give counterfeit products a plausibility of authenticity.

The present invention can thus be used to carry out inventories of products in commercial or storage spaces and to easily detect any RFID transponder that is not authentic, and therefore potentially associated with a counterfeit product.

In addition, the present invention advantageously includes computer programs, each configured to be implemented by at least one processor in connection with at least one non-transient memory and a power supply source.

Preferably, the present invention comprises a computer program configured to be implemented in at least one RFID transponder and a computer program configured to be implemented in at least one RFID reader for example and/or in at least one encryption module and/or in at least one database. These two programs being able to implement the present invention.

The invention is not limited to the embodiments previously described and extends to all the embodiments covered by the claims. In particular, certain steps may be carried out in a different order in order to adapt to the needs of the application field of the present invention.

REFERENCES

UID: A preferably unique Identification number, from the English "Unique Permanent Identification", of an RFID transponder;
A1: First series of random numbers;
A2: Second series of random numbers;
F1: First encryption function, preferably not accessible to the RFID transponder;

F2: Second encryption function, preferably not accessible to the RFID transponder;
F1': First encryption function, preferably accessible to the RFID transponder;
F2': Second encryption function, preferably accessible to the RFID transponder;
R1: First result equal to F1(A1) preferably F1(A1, A2);
R1': Second result equal to F1'(A1) preferably F1'(A1, A2);
R2': Third result equal to F2'(A2) preferably F2'(A1, A2);
R2: Fourth result equal to F2(A2) preferably F2(A1, A2);
10: RFID reader;
11: Encryption module;
12: Database;
12a: Database gateway;
12b: RFID transponder database;
12c: Product database;
13: Authentication platform;
20: RFID transponder, TAG;
21: RFID transponder, TAG;
22: RFID transponder, TAG;
23: RFID transponder, TAG;
24: RFID transponder, TAG;
100: Signals sent from the RFID reader to the RFID transponder;
110: Sending at least a first series of random numbers A1 from the RFID reader to the RFID transponder;
120: Sending at least one first result R1 from the RFID reader to the RFID transponder;
130: Sending at least one request for an identification number from the RFID reader to the RFID transponder;
200: Signals sent from the RFID transponder to the RFID reader;
210: Sending at least a second set of random numbers A2 from the RFID transponder to the RFID reader;
220: Sending at least a third result R2' from the RFID transponder to the RFID reader;
230: Sending of at least one identification number from the RFID transponder to the RFID reader;
300: Signals sent from the encryption module to the RFID reader;
310: Sending at least a first set of random numbers A1 from the encryption module to the RFID reader;
310a: Sending at least a first series of random numbers A1 from the authentication platform to the RFID reader;
310b: Sending at least a first series of random numbers A1 from the encryption module to the authentication platform;
320: Sending at least one first result R1 from the encryption module to the RFID reader;
320a: Sending at least one first result R1 from the authentication platform to the RFID reader;
320b: Sending at least one first result R1 from the encryption module to the authentication platform;
330: Sending at least one command to request the identification number of at least one RFID transponder from the encryption module to the RFID reader;
330a: Sending at least one command to request the identification number of at least one RFID transponder from the authentication platform to the RFID reader;
330b: Sending at least one command to request the identification number of at least one RFID transponder from the encryption module to the authentication platform;
400: Signals sent from the RFID reader to the encryption module;
401a: Sending at least one request for authentication from the RFID reader to the authentication platform;
401b: Sending at least one request for at least a first series of random numbers A1 from the authentication platform to the encryption module;
410: Sending at least a second set of random numbers A2 from the RFID reader to the encryption module;
410a: Sending at least a second set of random numbers A2 from the RFID reader to the authentication platform;
410b: Sending at least a second set of random numbers A2 from the authentication platform to the encryption module;
420: Sending at least a third result R2' from the RFID reader to the encryption module;
420a: Sending at least a third result R2' from the RFID reader to the authentication platform;
420b: Sending at least a third result R2' from the authentication platform to the encryption module;
500: Signals sent from the RFID reader to the database;
510: Sending at least one identification number from the RFID reader to the database;
510a: Sending at least one identification number from the RFID reader to the authentication platform;
510b: Sending at least one identification number from the authentication platform to the database;
510c: Sending at least one identification number from the database gateway to the RFID transponder database;
510d: Sending at least one identification number from the database gateway to the product database;
600: Signals sent from the database to the RFID reader;
610: Sending at least one data related to a product from the database to the RFID reader;
610a: Sending at least one data related to a product from the authentication platform to the RFID reader;
610b: Sending at least one data related to a product from the database to the authentication platform;
610c: Sending at least one RFID transponder existence information from the RFID transponder database to the database gateway;
610d: Sending at least one piece of information about a product from the product database to the database gateway.

The invention claimed is:
1. A secure communication method executed by a microprocessor comprising:
sending a series of random numbers (A1) to an RFID transponder from an RFID reader;
receiving a series of random numbers (A2) from the RFID transponder;
sending a result (R1) encrypted from the series of random numbers (A1) and an encryption function (F1);
receiving a result (R1') encrypted from the series of random number (A1) and an encryption function (F1');
in response to (R1') being equal to (R1), unlocking a locked communication mode with an RFID transponder;
receiving an identification number of the RFID transponder;
receiving a result (R2') encrypted from the series of random numbers (A2) and encryption function (F2');
in response to comparing the result (R1) with the result (R1') and in response to the result (R1') being different from the result (R1), remaining in the locked communication mode;
in response to receiving the result (R2'),
comparing the result (R2') with result (R2) encrypted from the series of random numbers (A2) and encryption function (F2);

in response to the result (R2') being equal to the result (R2), sending a request for the identification number; and in response to receipt of the request for the identification number, and in response to being in an unlocked communication mode, sending the identification number.

2. The method according to claim 1, wherein the result (R2) is carried out before the receipt of the result (R2') the RFID reader.

3. The method according to claim 1, further comprising:
in response to the receiving the result (R2'), encrypting the result (R2).

4. The method according to claim 1, further comprising:
encrypting the result (R1) from the series of random numbers (A1) and the series of random numbers (A2) with the encryption function (F1), and
encrypting the result R1' from the series of random numbers (A1) and the series of random numbers (A2) with the encryption function (F1').

5. The method according to claim 1, further comprising:
encrypting the result (R2') from:
the series of random numbers (A1);
the series of random numbers (A2); and
the encryption function (F2), and
encrypting the result R2 from:
the series of random numbers (A1),
the series of random numbers (A2); and
the encryption function (F2').

6. The method according to claim 1, further comprising:
in response to the sending of the result (R1), receiving the series of random numbers A2 to the RFID reader.

7. The method according to claim 1, wherein the RFID reader is configured to receive and send wired or wireless communication with a database.

8. The method according to claim 7, further comprising:
in response to the receiving the identification number, sending the identification number to the database.

9. The method according to claim 8, further comprising:
in response to the sending to the database of the identification number, receiving from database data associated with the identification number after identification of the RFID transponder by the database.

10. The method according to claim 1, wherein the RFID reader is configured to send and received wired or wireless communication with an encryption module, the method further comprising:
receiving the series of random numbers (A1) from the encryption module.

11. The method according to claim 1, further comprising:
encrypting the result R1 and the result R2 from the encryption function F1 and the encryption function F2.

12. The method according to claim 1, further comprising:
encrypting the result R1 and the result R2 at an encryption module that includes the encryption function F1 and the encryption function F2.

13. The method according to claim 12, further comprising:
receiving from the encryption module the result R1 encrypted by the encryption module before the sending the result R1 to the RFID transponder.

14. The method according to claim 10, further comprising:
in response to the receiving the series of random numbers (A2), sending the series of random numbers (A2) to the encryption module.

15. The method according to claim 10, further comprising:
in response to the receiving the result R2' sent by the RFID transponder, sending the result R2' to the encryption module.

16. The method according to claim 15, further comprising:
in response to the sending the result R2' to the encryption module, receiving from the encryption module a request for the identification number of the RFID transponder, in response to the result R2 being equal to the result R2'.

17. The method according to claim 10, further comprising:
comparing the result R2 with the result R2' with the encryption module.

18. The method according to claim 10, wherein the encryption module is an application server.

19. The method according to claim 1, further comprising:
associating the RFID transponder as a manufactured product positioned in a commercial sales area or a warehouse.

20. The method according to claim 1, further comprising:
in response to sending the request for the identification number, and in response to the unlocked communication mode, receiving the identification number.

21. A secure RFID inventory and authentication system, comprising:
an RFID transponder comprising:
an identification number being associated with a manufactured product positioned in a commercial space; and
an RFID reader;
a memory having a program stored therein; and
a microprocessor coupled to the memory, and being configured to execute the program, thereby causing the microprocessor to:
send from the RFID reader to the RFID transponder;
send from the RFID transponder a series of random numbers (A2) to the RFID reader;
send from the RFID reader to the RFID transponder a result (R1), generated from a series of random numbers (A1) and an encryption function (F1) stored in the memory;
in response to the RFID transponder receiving the series of random numbers (A1) and the result (R1), the RFID transponder compares the result R1 received with result R1' generated from the series of random numbers (A1) received and encryption function (F1') stored in the memory;
in response to the comparing the result R1 received with the result R1' and in response to the result R1' being equal to the result R1 received, switch from a locked communication mode to an unlocked communication mode enabling the RFID transponder to transmit on request the identification number to the RFID reader;
send to the RFID reader a result (R2'), generated from series of random numbers (A2) and encryption function (F2') stored in the memory;
in response to the comparing the result (R1) with the result (R1') and in response to the result R1' being different from the result R1, the RFID transponder remains in the locked communication mode preventing the RFID transponder from transmitting on request the identification number to the RFID reader;

in response to the RFID reader receiving the series of random numbers (A2) and the result R2', the RFID reader compare the result (R2') with result (R2) generated from the series of random numbers (A2) received and encryption function (F2) stored in the memory; and in response to the result (R2') being equal to the result (R2), then the RFID reader sends a request for the identification number to the RFID transponder.

22. A non-transitory computer readable medium including instructions executable by a microprocessor to perform operations comprising:

receiving from an RFID transponder a series of random numbers (A2) to at an RFID reader;

in response to sending a series of random numbers (A1) and result R1, comparing the result R1 with result (R1') encrypted from the series of random numbers (A1) by encryption function (F1');

in response to comparing the result (R1) received with the result (R1') and in response to the result (R1') is equal to the result (R1) switching from a locked communication mode to an unlocked communication mode enabling the receiving of an identification number;

sending to the result (R2'), encrypted from the series of random numbers (A2) and by encryption function (F2');

in response to comparing the result (R1) with the result (R1') and in response to the result (R1') being different from the result (R1), remaining in the locked communication mode preventing receipt of the identification number; and in response to receipt of a request for the identification number, and in response to the unlocked communication mode, then receiving the identification number.

23. A RFID transponder comprising:

an antenna;

a microprocessor; and a non-transient memory including instructions executable by a microprocessor to perform operations comprising:

receiving a series of random numbers (A1);

sending a series of random numbers (A2) to an RFID reader;

receiving a result (R1), encrypted from the series of random numbers (A1) by encryption function (F1);

in response to the receiving the series of random numbers (A1) and the result (R1), comparing the result (R1) with result (R1') encrypted from the series of random numbers (A1) by encryption function (F1');

in response to comparing the result (R1) with the result (R1') and the result (R1') being equal to the result (R1), switching from a locked communication mode to an unlocked communication mode allowing the RFID transponder to transmit on request an identification number;

sending a result (R2') encrypted from series of random numbers (A2) and by encryption function (F2');

in response to comparing the result (R1) with the result (R1') and in response to the result (R1') being different from the result (R1), remaining in the locked communication mode preventing the transmitting on request the identification number;

sending the series of random numbers (A2) and the result (R2'), the result (R2) encrypted from the series of random numbers (A2) by encryption function F2;

in response to the result (R2') being equal to the result R2, receiving a request for the identification number; and in response to receipt of the request for the identification number, and in response to the RFID transponder being in the unlocked communication mode, sending the identification number.

24. A non-transitory computer readable medium including instructions executable by a microprocessor to perform operations comprising:

send from an RFID reader a series of random numbers (A1) to an RFID transponder;

send result (R1), encrypted from the series of random numbers (A1) and by encryption function (F1);

in response to receiving series of random numbers (A2) and result (R2'), compare the result (R2') with the result (R2) encrypted from series of random numbers (A2) by encryption function (F2);

in response to the result (R2') being equal to the result (R2), send a request for an identification number to the RFID transponder.

* * * * *